United States Patent
Tanaka (10) Patent No.: US 9,804,805 B2
(45) Date of Patent: Oct. 31, 2017

(54) DISK ARRAY APPARATUS, CONTROL METHOD THEREFOR, AND STORAGE MEDIUM

(71) Applicant: NEC Corporation, Minato-ku, Tokyo (JP)

(72) Inventor: Yoji Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/601,393

(22) Filed: Jan. 21, 2015

(65) Prior Publication Data

US 2015/0212750 A1    Jul. 30, 2015

(30) Foreign Application Priority Data

Jan. 29, 2014   (JP) ................................ 2014-013891

(51) Int. Cl.
*G06F 3/06* (2006.01)

(52) U.S. Cl.
CPC .......... *G06F 3/0689* (2013.01); *G06F 3/0607* (2013.01); *G06F 3/0661* (2013.01); *G06F 3/0685* (2013.01)

(58) Field of Classification Search
None
See application file for complete search history.

(56) References Cited

U.S. PATENT DOCUMENTS

| | | | | | |
|---|---|---|---|---|---|
| 5,822,782 | A | * | 10/1998 | Humlicek | G06F 3/0626 711/114 |
| 2005/0182992 | A1 | * | 8/2005 | Land | G06F 3/0607 714/701 |
| 2006/0282638 | A1 | * | 12/2006 | Oshima | G06F 3/0622 711/170 |
| 2009/0030953 | A1 | * | 1/2009 | Fukuda | G06F 3/0607 |
| 2010/0262775 | A1 | * | 10/2010 | Ito | G06F 11/1076 711/114 |
| 2015/0032955 | A1 | * | 1/2015 | Suzuki | G06F 3/0689 711/114 |

FOREIGN PATENT DOCUMENTS

| | | |
|---|---|---|
| JP | H11-212846 A | 8/1999 |
| JP | 2001-337792 A | 12/2001 |
| JP | 2009-157471 A | 7/2009 |
| JP | 2010-066832 A | 3/2010 |

OTHER PUBLICATIONS

Japanese Office Action for JP Application No. 2014-013891 dated Dec. 24, 2015 with English Translation.

* cited by examiner

*Primary Examiner* — Hashem Farrokh
*Assistant Examiner* — Michelle Taeuber (57) ABSTRACT

A disk array apparatus includes a conversion rule storage unit that stores a conversion rule associated with a plurality of generations in a configuration table of the disk array apparatus and a control unit that, from a disk device which stores a generation identifier indicating the generation and a configuration table, retrieves the generation identifier, and converts the configuration table on the basis of the conversion rule associated with the retrieved generation identifier.

7 Claims, 7 Drawing Sheets

| NO | CONVERSION RULE | APPLIED GENERATION |
|----|-----------------|--------------------|
| 1 | ADD THE FOLLOWING ONE LINE INTO RAID LEVEL INDICATION<br><br>\| RAID-X \| 0 \| | 3 |
| 2 | ADD THE FOLLOWING TWO LINES INTO RAID LEVEL INDICATION<br><br>\| RAID-5 \| 0 \|<br>\| RAID-X \| 0 \| | 1, 2 |
| 3 | ADD THE FOLLOWING ONE LINE INTO DISK TYPE INDICATION<br><br>\| TYPE C \| 0 \| | 1, 2, 3 |
| 4 | EXPAND SIZE OF AREA FOR DATA STORAGE CAPACITY FROM 4 BYTES TO 8 BYTES | 2, 3 |
| 5 | EXPAND SIZE OF AREA FOR DATA STORAGE CAPACITY FROM 2 BYTES TO 8 BYTES | 1 |

Fig.6

DISK ARRAY APPARATUS, CONTROL METHOD THEREFOR, AND STORAGE MEDIUM

INCORPORATION BY REFERENCE

This application is based upon and claims the benefit of priority from Japanese Patent Application No. 2014-013891, filed on Jan. 29, 2014, the disclosure of which is incorporated herein in its entirety by reference.

TECHNICAL FIELD

The present invention relates to disk array apparatus, control methods therefor, and storage media, and in particular, the present invention relates to a disk array apparatus which uses a disk unit (disk device) used in a disk array apparatus of a different generation, a control method therefor, and a storage medium.

BACKGROUND ART

With respect to a disk array apparatus as well as a disk unit for use in a disk array apparatus, the following technologies are disclosed.

In Japanese Unexamined Patent Application Publication No. 2001-337792, there is disclosed a disk array apparatus in which a disk controller manages, in a mapping manner, a logical configuration of a redundant arrays of inexpensive disks (RAID) and physical location information associated with disk units constituting the RAID. This disk array apparatus writes configuration information into a disk unit before relocation. Further, after the relocation, the disk array apparatus retrieves the configuration information from the disk unit, and corrects mapping information. This is for solving a situation in which, with the relocation of the disk unit between disk array apparatus, the disk unit constituting the RAID is removed from a disk array apparatus once, and is inserted into a different location in other disk array apparatus after the relocation.

When a disk unit is moved to a new disk array apparatus having a larger mounting capacity by using such a technology described above, an administrator of the disk array apparatus installs mapping information (configuration information) into the new disk array apparatus. Thereafter, the administrator of the disk array apparatus attaches the disk unit in the new disk array apparatus.

In Japanese Unexamined Patent Application Publication No. 2010-066832, there is disclosed a controller for a storage system in which, to disk drives (disk units) constituting a RAID, a new disk is added, and this RAID is configured as a new RAID constituted by the new disk drive and the disk drives.

SUMMARY

An exemplary object of the invention is to provide a disk array apparatus, control method therefore, and a storage medium that can use a disk device used in a disk array apparatus of a previous generation.

A disk array apparatus according to an exemplary aspect of the invention includes a conversion rule storage unit that stores a conversion rule associated with a plurality of generations in a configuration table of the disk array apparatus; and a control unit that, from a disk device which stores a generation identifier indicating the generation and a configuration table, retrieves the generation identifier, and converts the configuration table on the basis of the conversion rule associated with the retrieved generation identifier.

A control method for a disk array apparatus according to an exemplary aspect of the invention includes storing a conversion rule associated with a plurality of generations in a configuration table of the disk array apparatus and from a disk device which stores a generation identifier indicating the generation and a configuration table, retrieving the generation identifier, and converting the configuration table on the basis of the conversion rule associated with the retrieved generation identifier.

A computer readable non-transitory storage medium embodying a program, the program causing a disk array apparatus to perform a method, the method according to an exemplary aspect of the invention includes storing a conversion rule associated with a plurality of generations in a configuration table of the disk array apparatus and from a disk device which stores a generation identifier indicating the generation and a configuration table, retrieving the generation identifier, and converting the configuration table on the basis of the conversion rule associated with the retrieved generation identifier.

BRIEF DESCRIPTION OF THE DRAWINGS

Exemplary features and advantages of the present invention will become apparent from the following detailed description when taken with the accompanying drawings in which.

EXEMPLARY EMBODIMENT

First Exemplary Embodiment

A disk array apparatus 10 according to a first exemplary embodiment of the present invention will be described with reference to the drawings.

Figure 1:
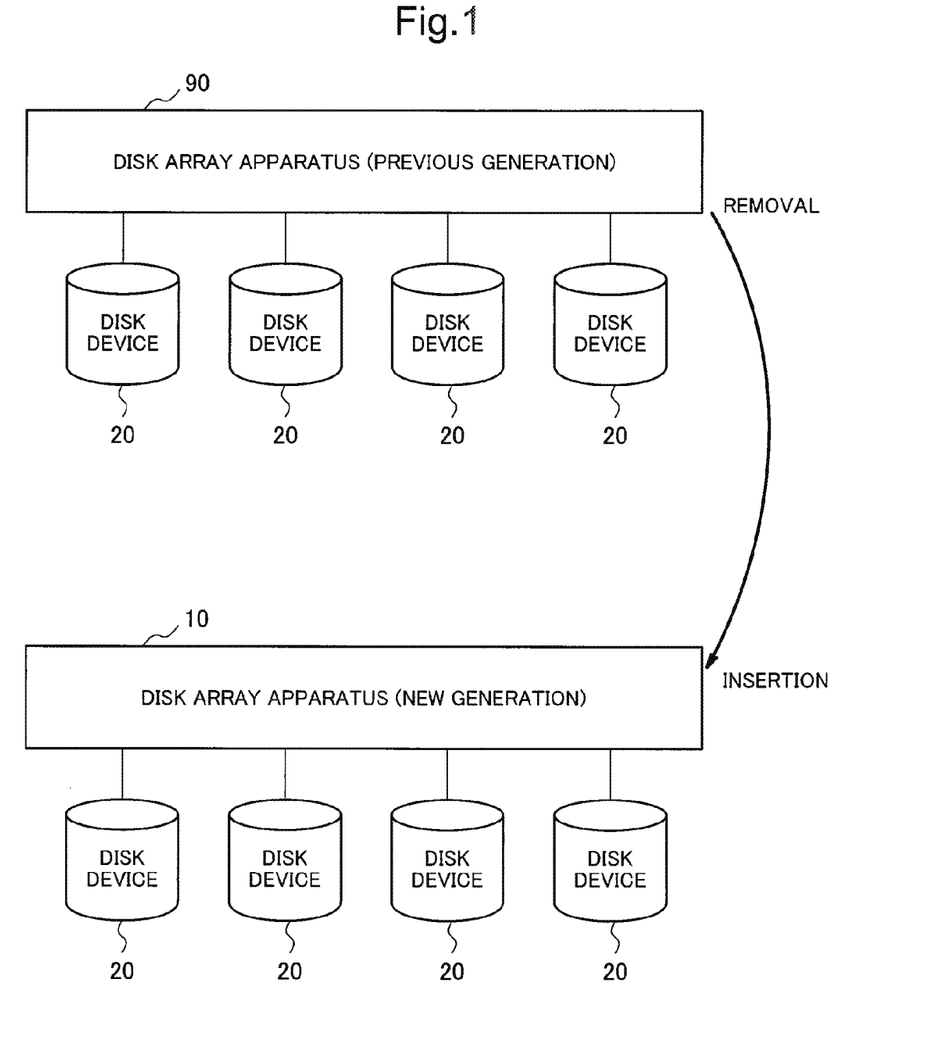
FIG. 1 is a diagram illustrating an example of a situation where a disk array apparatus according to a first exemplary embodiment of the present invention is used.

FIG. 1 is a diagram illustrating an example of a situation where the disk array apparatus 10 according to the first exemplary embodiment of the present invention is used. In the example shown in FIG. 1, a user uses a disk array apparatus 90. The disk array apparatus 90 is a previous-generation product under a situation where, for example, the sale thereof is stopped, or the maintenance support thereof is terminated. For this reason, the user replaces the disk array apparatus 90 by a newer-generation product, that is, a disk array apparatus 10 according to this exemplary embodiment. In this case, the user removes disk devices 20 mounted in the disk array apparatus 90, and uses them by inserting them in the disk array apparatus 10.

Figure 2:
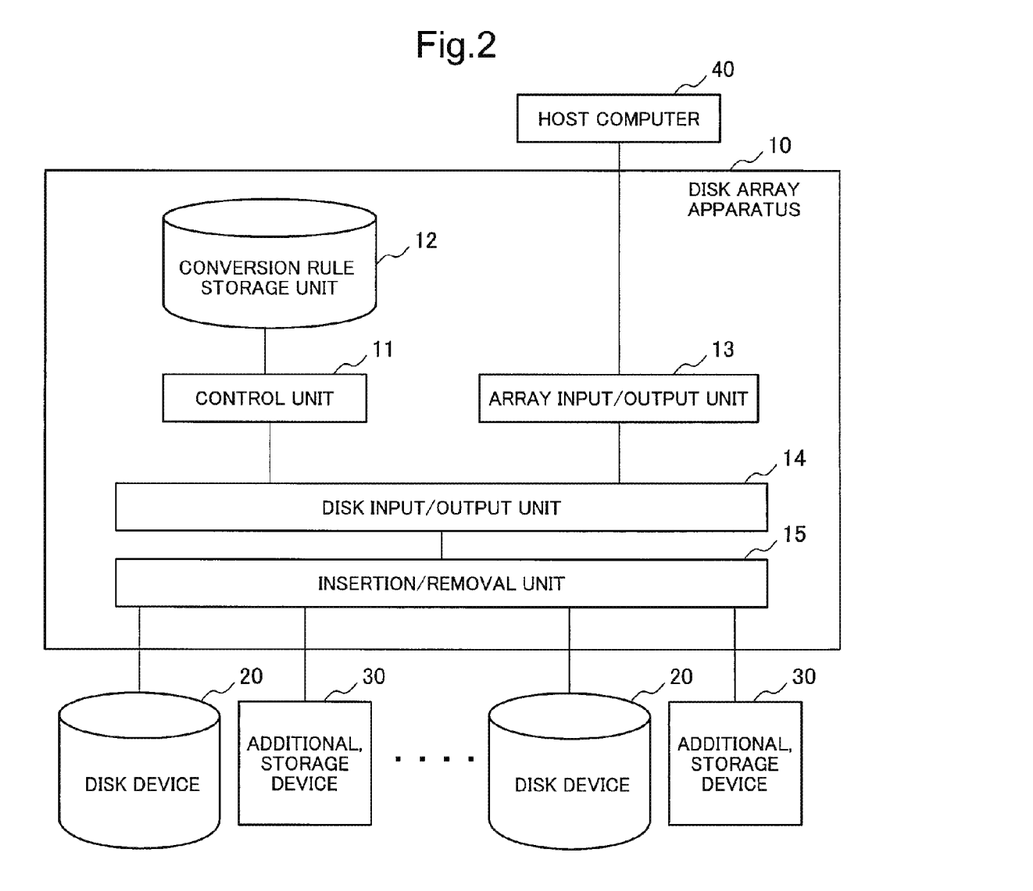
FIG. 2 is a block diagram illustrating an example of a configuration of the disk array apparatus according to the first exemplary embodiment of the present invention.

FIG. 2 is a diagram illustrating an example of a configuration of the disk array apparatus 10 according to this exemplary embodiment. The disk array apparatus 10 includes a control unit 11, a conversion rule storage unit 12, an array input/output unit 13, a disk input/output unit 14, and an insertion/removal unit 15. The disk array apparatus 10 is connected to a host computer 40.

Each of the disk devices 20 shown in FIG. 2 is a new-generation disk unit (disk device) or a previous-generation disk unit (disk device).

The insertion/removal unit 15 is a connection mechanism for attaching/detaching (inserting/removing) at least one disk device 20, which is a same generation as that of the disk array apparatus 10, to/from (into/from) the disk array apparatus 10. As described below, the insertion/removal unit 15 attaches/detaches (inserts/removes) at least one disk device 20 of a previous generation and at least one additional storage device 30 to/from (into/from) the disk array apparatus 10 as necessary (refer to FIG. 5). The insertion/removal unit 15 includes, for example, a universal serial bus (USB) connector or a Secure Digital (SD) memory card insertion slot for connecting to the disk device 20 and the additional storage device 30.

The control unit 11 controls the disk array apparatus 10. The control unit 11 performs building up of a RAID, settings of the disk devices 20, data control, relief measures for malfunctions of components, and the like. Further, the control unit 11 retrieves a configuration table (configuration information) 22 (FIG. 3) generated by the disk array apparatus 90. Then, the control unit 11 converts a form of the retrieved configuration table 22 into a form which can be recognized by the array input/output unit 13 of the disk array apparatus 10, that is, a form which can be used by the disk array apparatus 10 of a new generation. For example, the control unit 11 converts the configuration table 22 in order to make it possible for a corresponding to a support of a new RAID level, a new type of the disk devices 20, and an expanded specification.

The conversion rule storage unit 12 stores a conversion rule which is used when the control unit 11 performs the conversion described above.

The array input/output unit 13, when receiving an input/output request from the host computer 40, performs input/output operation of user data 23 to/from the disk device 20 on the basis of a RAID configuration written on the configuration tables 22. For example, when retrieving user data 23 which is duplexed (RAID-1), the array input/output unit 13 retrieves the user data 23 from any one of two disk devices 20 constituting the RAID-1. The host computer 40 requests an access of the user data 23 to the array input/output unit 13 on the basis of a request from an application program executed by oneself.

The disk input/output unit 14 acquires an input/output request, in which a disk device 20 is specified, from the control unit 11 or the array input/output unit 13, and performs input/output operation to/from the specified disk device 20. The disk input/output unit 14 may operate on the basis of an operation system (OS) including a kernel and a driver.

The additional storage device 30 is a storage device which is associated with the disk device 20. More specifically, as described below, the additional storage device 30 stores therein the configuration table 22 for the corresponding disk device 20. The additional storage device 30 may be, for example, an SD memory card or a USB memory. Alternatively, the additional storage device 30 may be a hard disk device or a solid state drive (SSD).

The control unit 11, the array input/output unit 13, and the disk input/output unit 14 are each constituted by a logic circuit.

Figure 7:
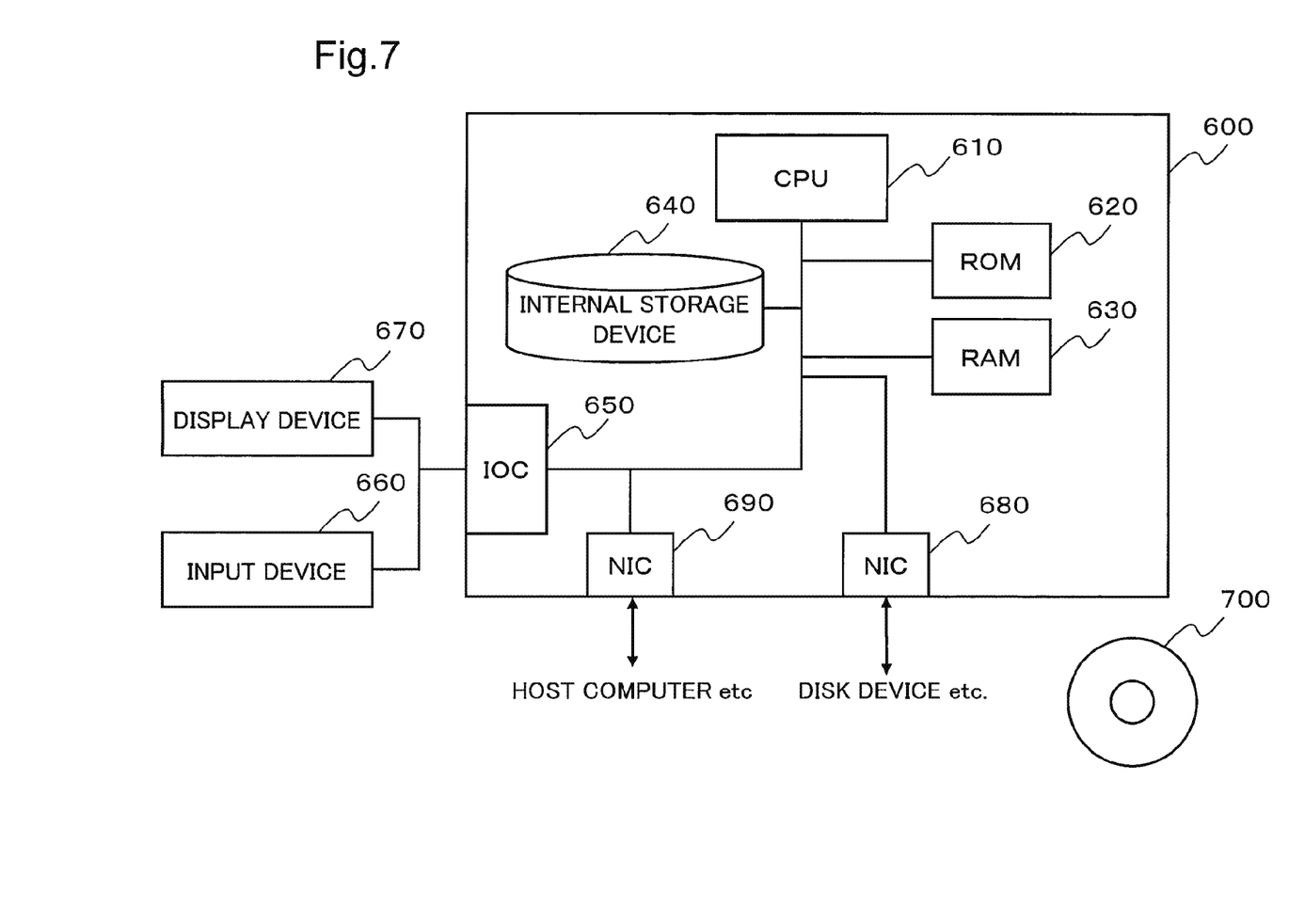
FIG. 7 is a block diagram illustrating an example of a configuration of the disk array apparatus according to the first exemplary embodiment of the present invention.

Alternatively, the disk array apparatus 10 may be realized as a computer device, such as shown in FIG. 7, which includes a central processing unit (CPU), a read only memory (ROM) and a random access memory (RAM). The disk array apparatus 10 may be realized as a computer device which further includes an input/output circuit (IOC) and a network interface circuit (NIC) in addition to the above-described components.

A disk array apparatus 600 shown in FIG. 7 includes a CPU 610, a ROM 620, a RAM 630, an internal storage device 640, an IOC 650, an NIC 680, and an NIC 690, and constitutes a computer device.

The CPU 610 retrieves a program from the ROM 620. Further, the CPU 610 controls the RAM 630, the internal storage device 640, the IOC 650, and the NIC 680 on the basis of the retrieved program. Further, the computer including the CPU 610 controls these components, and thereby realizes each of functions as the control unit 11, the array input/output unit 13, the disk input/output unit 14, and the insertion/removal unit 15.

When realizing the each of functions, the CPU 610 may use the RAM 630 or the internal device 640 as a temporary storage of the programs.

Further, the CPU 610 may retrieve a program contained in a storage medium 700 which stores the program therein so as to make it possible for a computer to read the programs, by using a storage medium reading device (not illustrated). Alternatively, the CPU 610 may receive a program from an external device (not illustrated) via the NIC 680 or the NIC 690, store the program in the RAM 630, and operate on the basis of the stored program.

The ROM 620 stores therein a program executed by the CPU 610 and fixed data. The ROM 620 is, for example, a programmable-ROM (P-ROM) or a flash ROM.

The RAM 630 temporarily stores a program executed by the CPU 610 and data used in the execution by the CPU 610. The RAM 630 is, for example, a dynamic-RAM (D-RAM).

The internal storage device 640 stores therein data and a program which is stored on a long-term in the information processing device 600. Further, the internal storage device 640 may operate as a temporal storage device for the CPU 610. The internal storage device 640 is, for example, a hard disk device, a magneto optical disk device, a solid state drive (SSD), or a disk array apparatus. The internal storage device 640 operates as a conversion rule storage unit 12.

The ROM 620 and the internal storage device 640 are non-transitory recording media. Further, the RAM 630 is a transitory recording medium. The CPU 610 is operable on the basis of programs stored in the ROM 620, the internal storage device 640, or the RAM 630. That is, the CPU 610 is operable using a non-transitory storage medium or a transitory storage medium.

The IOC 650 mediates data exchanged between the CPU 610 and the input device 660 and between the CPU 610 and the display device 670. The IOC 650 is, for example, an IO interface card or a universal serial bus (USB) card.

The input device 660 is a device which receives input instructions from an operator of the information processing device 600. The input device 660 is, for example, a keyboard, a mouse device, or a touch panel.

The display device 670 is a device for displaying thereon information provided to the operator of the information processing device 600. The display device 670 is, for example, a liquid crystal display.

Each of the NIC 680 and the NIC 690 relays data exchange with any one of external devices (not illustrated). Each of the NIC 680 and the NIC 690 is, for example, a local area network (LAN) card, a USB connector, or an SD card insertion slot. The NIC 680 operates as the insertion/removal unit 15. Further, the NIC 690 operates as the array input/output unit 13.

In other words, the control unit 11, the array input/output unit 13, and the disk input/output unit 14 shown in FIG. 2 may be a program stored in the ROM 620, which is realize by using a computer, the internal storage device 640, or the storage medium 700. Alternatively, these functions may be realized by causing the CPU 610 included in the disk array apparatus 600 to execute the program. Further, the conversion rule storage unit 12 may be realized by a semiconductor memory device or a storage device of a disk device.

Further, the disk array apparatus 10 may include the disk device 20 and the additional storage device 30.

Figure 3:
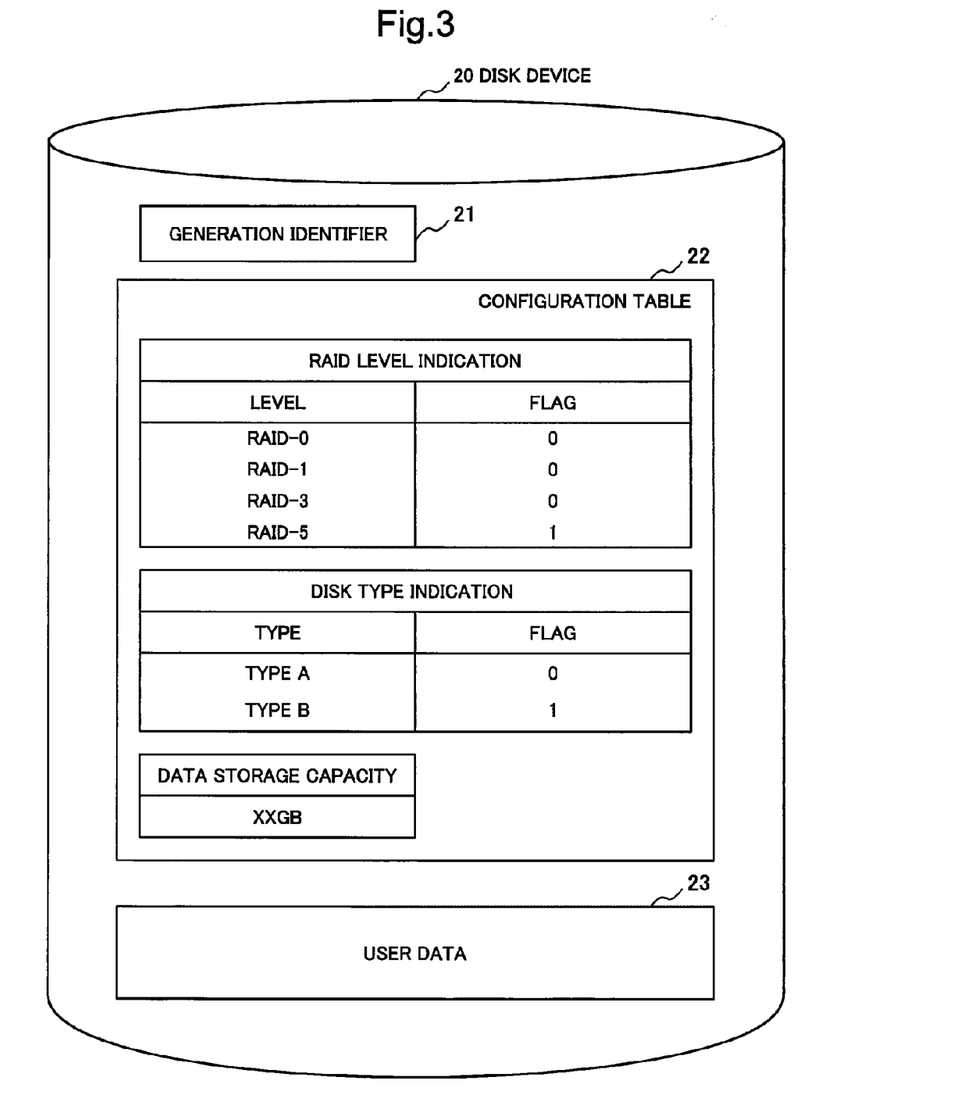
FIG. 3 is a diagram illustrating an example of a structure of data stored in the disk device according to the first exemplary embodiment of the present invention.

FIG. 3 is a diagram illustrating an example of a structure of data stored in the disk device 20 according to the first exemplary embodiment. The disk device 20 stores therein a generation identifier 21, the configuration table 22, and the user data 23.

The generation identifier 21 is information for identifying a generation of a disk array apparatus (i.e., information representing a generation of a disk array apparatus) which generates the configuration table 22. The generation identifier 21 stored in the disk device 20 which is moved from the disk array apparatus 90 is an identifier indicating the generation of the disk array apparatus 90. Further, a generation identifier stored in the disk device 20 which is stored in the disk array apparatus 10 from the initial stage of the disk array apparatus 10 is an identifier indicating the generation of the disk array apparatus 10.

The configuration table 22 is a table (configuration information) of data describing a RAID configuration of the disk array apparatus 10. The configuration table 22 is, for example, a structured document written in extensible markup language (XML). When converting the configuration table 22 (the configuration information), the control unit 11 determines the position and the size of a data item targeted for the conversion by using a tag or the like as a key. The configuration table 22 stored in the disk device 20 which is moved from the disk array apparatus 90 is a configuration table 22 which is stored in the disk device 20 by the disk array apparatus 90.

The configuration table 22 includes, for example, information indicating a RAID level (a RAID level indication). The RAID level indication includes, for example, options for the RAID level (i.e., RAID-0, RAID-1, RAID-3, and RAID-5), and a flag for indicating a selected option. The flag for indicating a RAID level is, for example, information which is set to "1" when an associated option is selected, and is set to "0" otherwise. When writing data, the array input/output unit 13 performs processes on the data on the basis of the RAID level indication. For example, the array input/output unit 13 determines duplication of data, addiction of parity data, or striping of data. That is, the user data 23 is duplicated or added parity data in accordance with the RAID level indication. Thus, the RAID level indication indicates an option for the availability level of the disk device 20.

Further, the configuration table 22 includes, for example, information indicating a type of the disk device 20 (a disk type indication). The disk type indication includes an option for a type of the disk device 20 (a disk model), and a flag for indicating a type of the disk device 20. The flag for indicating a type of the disk device 20 is, for example, set to "1" when an associated option corresponds to the type of the disk device 20, and is set to "0" otherwise. For example, the array input/output unit 13 uses this disk type indication for capacity calculation during operation of writing data. The disk type indication indicates an option for a kind of the disk device 20.

The configuration table 22 includes, for example, a data storage capacity of the disk device 20. For example, the array input/output unit 13 updates the data storage capacity when adding data, and refers to the data storage capacity when generating a report.

When a plurality of disk devices 20 are connected to the disk array apparatus 10, all of the disk devices 20 may store the configuration table 22 structured in the same manner. Alternatively, each of the disk devices 20 may store each of data items which are distributed. Further, at least a part of the disk devices 20 may not store the configuration table 22. A method of storing the configuration table 22 may be determined in accordance with a RAID implementation method.

The user data 23 is a data which is performed RAID conversion process to writing data output from the host computer 40 by the disk device 20 on the basis of the RAID level indication, and is stored. Thus, the user data 23 may include a copy of writing data which is duplicated. Alternatively, the user data 23 may include parity data added by the array input/output unit 13, or pointer data.

Figure 4:
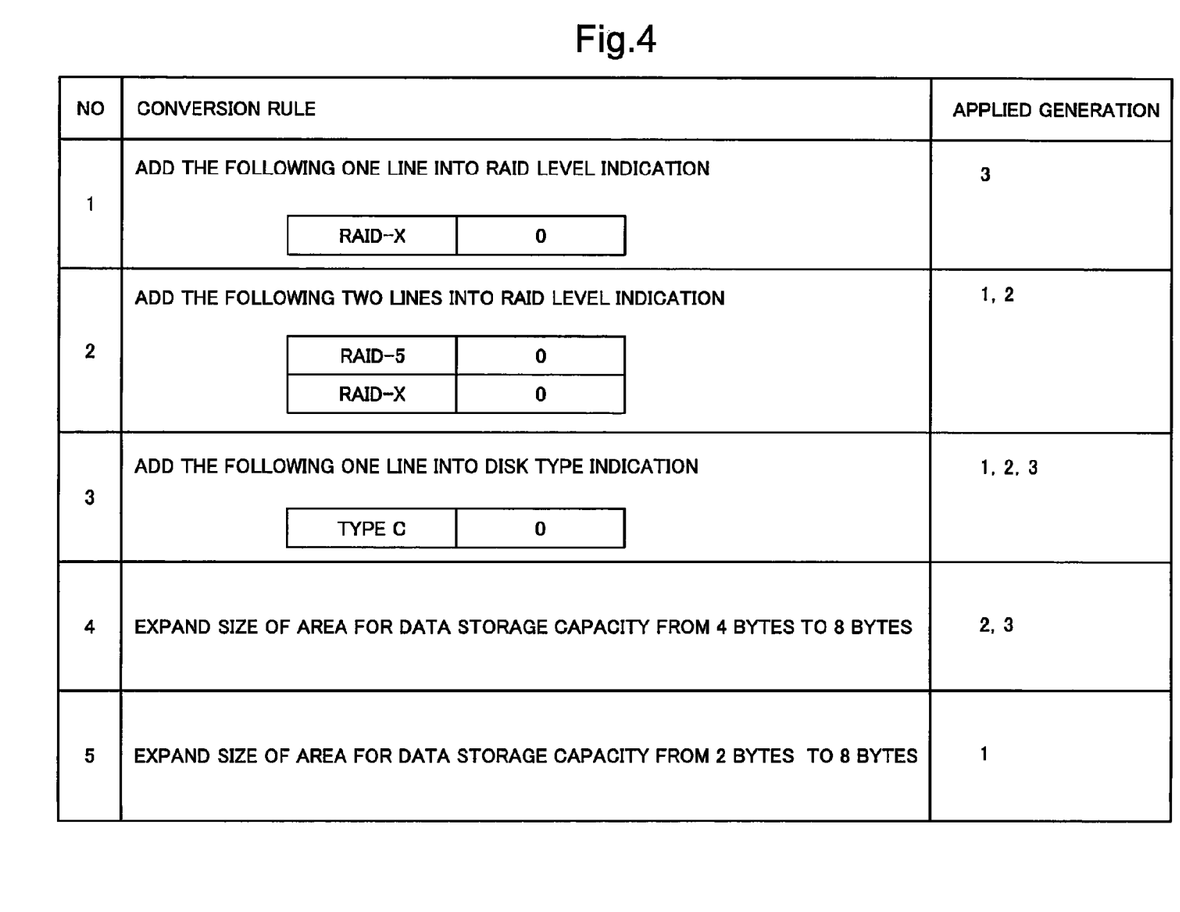
FIG. 4 is a diagram illustrating an example of a structure of data stored in a conversion rule storage unit according to the first exemplary embodiment of the present invention.

FIG. 4 is a diagram illustrating an example of a structure of data stored in the conversion rule storage unit 12 according to the first exemplary embodiment. The conversion rule storage unit 12 stores a conversion rule applied to the configuration table 22 and a generation identifier applied to the conversion rules, such that they are associated with each other. That is, the conversion rule is a conversion rule of the configuration table 22 associated with a generation of the disk array apparatus 10, the disk array apparatus 90, or the like.

For example, the conversion rule denoted by the number 1 of FIG. 4 is a rule that is applied to the configuration table 22 generated by a third generation disk array apparatus, and that adds an option "RAID-X" for the RAID level together with a flag value "0" into the RAID level indication (No. 1 of FIG. 4). The conversion rule denoted by the number 1 of FIG. 4 is generated when, for example, the disk array apparatus 10 becomes a fourth-generation apparatus and the RAID-X is supported by fourth-generation apparatus. The conversion rule denoted by the number 1 is a rule which changes (adds) an option of the availability level. In addition, the change of the conversion rule is not limited to the addition, but may be a replacement or a removal.

Further, for example, a conversion rule denoted by the number 2 is a rule that is applied to a configuration table 22 generated by a first generation disk array apparatus and a second generation disk array apparatus, and that adds options "RAID-5" and "RAID-X" for the RAID level together with a flag value "0" into a RAID level (No. 2 of FIG. 4). The conversion rule denoted by the number 2 of FIG. 4 is generated when, for example, the disk array apparatus 10 becomes a fourth-generation apparatus, the RAID-5 is supported by third-generation apparatus, and the RAID-X is supported by fourth-generation apparatus. This conversion rule denoted by the number 2 is a rule which adds an option for the availability level.

For example, a conversion rule denoted by the number 3 is a rule that is applied to a configuration table 22 generated by a third generation disk array apparatus, and that adds an option "type C" together with a flag value "0" into a disk type indication (No. 3 of FIG. 4). The conversion rule denoted by the number 3 of FIG. 4 is generated when, for example, the disk array apparatus 10 becomes a fourth-generation apparatus and a disk device 20 which is of a type C is supported by a fourth-generation product. The conversion rule denoted by the number 3 is a rule which changes (adds) an option for a kind of the disk device 20. In addition, the change of the conversion rule is not limited to the addition, but may be a replacement or a removal.

For example, a conversion rule denoted by the number 4 is a rule that is applied to a configuration table 22 generated by a second generation disk array apparatus and a third generation disk array apparatus, and that changes (expands) the size of an area for storing a data storage capacity from four bytes to eight bytes (No. 4 of FIG. 4). For example, a conversion rule denoted by the number 5 is a rule that is applied to a configuration table 22 generated by a first generation disk array apparatus, and that expands the size of the area for storing a data storage capacity from two bytes to eight bytes (No. 5 of FIG. 4). The conversion rule denoted by the number 4 and the number 5 of FIG. 4 is generated, for example, when, in replacement from a first-generation product to second generation product, the size of the area for storing a data storage capacity is expanded from two bytes to four bytes, and, to a fourth-generation product, the size of the area for storing a data storage capacity is further expanded from four bytes to eight bytes. The conversion rules denoted by the numbers 4 and 5 are rules that change (expand) the size of the area for storing a data storage capacity of the disk device 20. In addition, the change of the conversion rule is not limited to the expansion, but may be a reduction.

Figure 5:
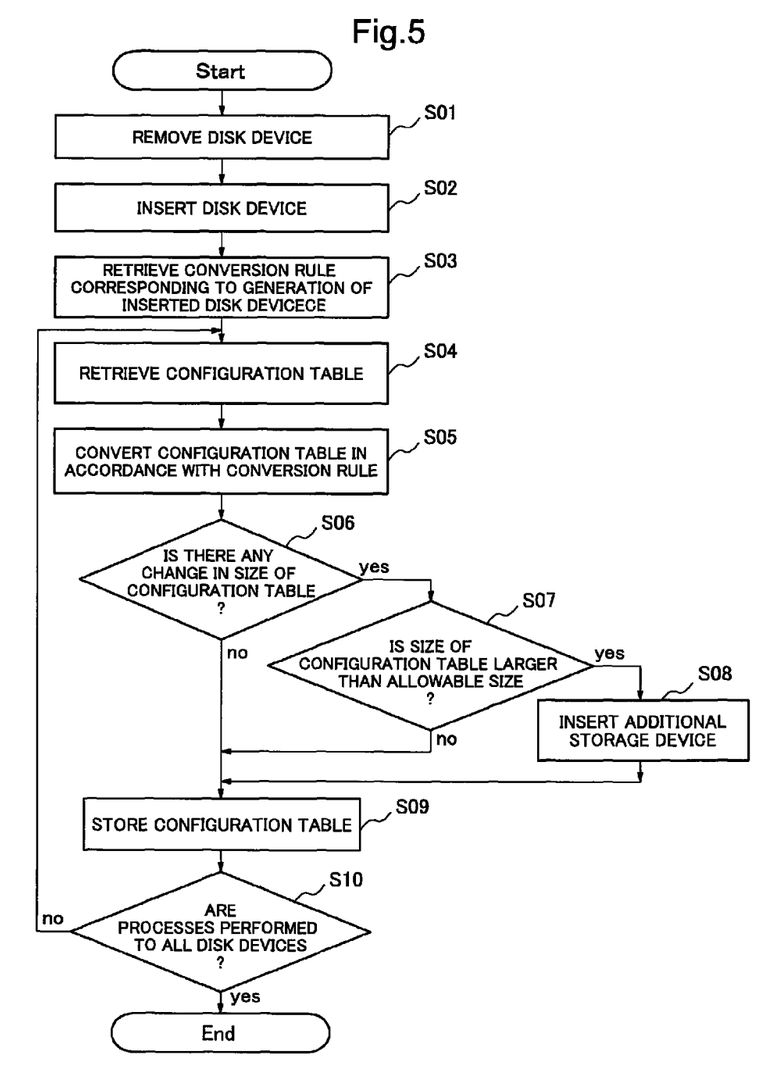
FIG. 5 is a flowchart illustrating an example of operation of the disk array apparatus according to the first exemplary embodiment of the present invention.

FIG. 5 is a flowchart illustrating an example of operation of the disk array apparatus 10 according to the first exemplary embodiment.

When the disk device 20 is moved from the disk array apparatus 90 to the disk array apparatus 10, a user of the disk array apparatus 10 removes the disk device 20 from the disk array apparatus 90 (step S01).

Further, the user inserts the removed disk device 20 into the disk array apparatus 10 (step S02).

After the insertion, the user instructs the control unit 11 to start operation by using a switch (not illustrated) of the disk array apparatus 10, or the like. Alternatively, the control unit 11 may start operation upon detection of the insertion of the disk device 20.

The control unit 11 retrieves the conversion rule and the information applied generations from the conversion rule storage unit 12 (step S03).

The control unit 11 retrieves the generation identifier 21 and the configuration table 22 from the inserted disk device 20 (step S04).

The control unit 11 converts the configuration table 22 on the basis of a rule which is applied to the generation indicated by the generation identifier 21 in the conversion rule (step S05).

The operation of the control unit 11 will be described in more detail. In the following description, the conversion rules shown in FIG. 4 are applied. Further, it is assumed that the disk array apparatus 10 is a fourth-generation apparatus, and the inserted disk device 20 is a third-generation disk device.

In this case, the control unit 11 applies the first, third, and fourth conversion rules in the conversion rules shown in FIG. 4. That is, the control unit 11 adds a line consisting of a level "RAID-X" and a flag "0" into the RAID level indication, adds a line consisting of a type "C" and a flag "0" into the disk type indication, and expands the size of the area for storing a data storage capacity from four bytes of data to eight bytes of data.

The configuration table 22, which is included in the inserted disk device 20 and which results from the conversion, becomes the configuration table 22 having a form used by the disk array apparatus 10 of a fourth generation. Further, in the configuration table 22 resulting from the conversion, the RAID level (RAID-X) and the disk type (type C), which are supported by the disk array apparatus 10 of a fourth generation, have flags which are set to "0". Thus, for example, the array input/output unit 13 of the disk array apparatus 10 of a fourth generation can recognize that, as a RAID level, "RAID-X" is not selected, but a different RAID level (for example, "RAID-5") is selected in the inserted disk device 20.

The control unit 11 confirms whether or not the size of the configuration table 22 after conversion is changed (step S06).

When the size of the converted configuration table 22 is changed (yes, in step S06), the control unit 11 confirms whether or not the size of the configuration table 22 is larger than an allowable size (step S07).

When exceeding the allowable size (yes, in step S07), the disk array apparatus 10 uses an additional storage device 30 in order to storing the configuration table 22 of the disk device 22. Thus, for example, the control unit 11 outputs a request message for inserting the additional storage device 30 on a display device (for example, the display device 670 shown in FIG. 7) of the disk array apparatus 10. Further, for example, the user inserts the additional storage device 30 into a predetermined location. When detecting the insertion of the additional storage device 30 corresponding to the disk device 20 (step S08), the control unit 11 stores the configuration table 22 into the additional storage device 30 (step S09). In addition, the allowable size is a maximum size of the configuration table 22 which can be stored in the disk device 20. The allowable size is stored in, for example, the disk device 20. In addition, the disk array apparatus 10 may store the allowable size therein.

When the size of the configuration table 22 is not changed (no, in step S06), or the size of the configuration table 22 is equal to or smaller than the allowable size (no, in step S07), the control unit 11 stores the converted configuration table 22 into the disk device 20 (step S09).

The control unit 11 determines whether or not the processes are performed to all the disk devices 20 (step S10).

When there is any disk device 20 on which the processes are not yet performed (no, in step S10), the control unit 11 performs the same processes on the other disk devices 20.

When the processes for all the disk devices 20 (yes, in step S10), the disk array apparatus 10 terminates the process.

When the conversion of the configuration table 22 is completed, even for the disk device 20 which is removed from the disk array apparatus 90 of a previous generation and is inserted into the disk array apparatus 10, the array input/output unit 13 can carry out an input/output request from the host computer 40 by using the configuration table 22 stored in the disk device 20. For example, the array input/output unit 13 can use the inserted disk device 20 in the same RAID level as the RAID level indication used in the disk array apparatus 90.

The disk array apparatus 10 according to this exemplary embodiment makes possible the advantage of using the disk device 20 which is used in the disk array apparatus 90 of a previous generation without converting the user data 23. For example, a user of the disk array apparatus 10 can use the disk device 20 in the disk array apparatus 10 of a new generation without moving the user data 23 and redesigning the storage configuration. This is because the control unit 11 converts the form of the configuration table 22 stored in the disk device 20 into a form which can be used by the array input/output unit 13 of a new generation on the basis of the conversion rule.

Further, the disk array apparatus 10 of this exemplary embodiment makes possible the advantage of flexibly dealing with the expansion of the configuration table 22 which occurs along with the conversion. This is because, when the size of the configuration table 22 exceeds along with the conversion and the disk device 20 cannot store the configuration table 22, the disk array apparatus 10 can store the configuration table 22 into the additional storage device 30 corresponding to the disk device 20. Moreover, the disk array apparatus 10 according to this exemplary embodiment makes possible the advantage of facilitating correspondence with a malfunction of a medium of the disk device 20, or the like. This is because the disk array apparatus 10 includes the additional storage device 30 for each disk device 20.

Second Exemplary Embodiment

Figure 6:
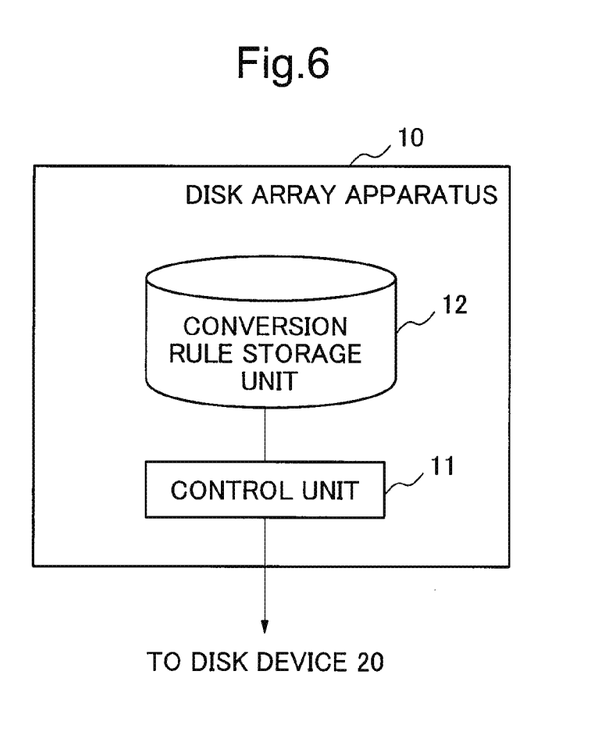
FIG. 6 is a block diagram illustrating an example of a configuration of a disk array apparatus according to a second exemplary embodiment of the present invention.

FIG. 6 is a block diagram illustrating an example of a configuration of a disk array apparatus 10 according to a second exemplary embodiment.

The disk array apparatus 10 includes a conversion rule storage unit 12 which stores therein a conversion rule for each generation, and a control unit 11. The control unit 11 retrieves the generation identifier 21 from the disk device 20 which stores therein the generation identifier 21 and the configuration table 22 as well as the first exemplary embodiment. Then, the control unit 11 rewrite the configuration table 22 of the disk device 20 on the basis of the conversion rule which is stored in the conversion rule storage unit 11 and which corresponds to the retrieved generation identifier 21 as well as the first exemplary embodiment.

The disk array apparatus 10 according to this exemplary embodiment make possible the advantage of using the disk devices 20 used in the disk array apparatus 90 of a previous generation in the disk array apparatus 10 without converting the user data 23 and the like as well as the first exemplary embodiment. Thus, a user can use the disk array apparatus which is a disk array apparatus of a new generation without moving the user data 23 and redesigning the storage configuration. This is because the control unit 11 converts the form of the configuration table 22 stored in the disk device 20 into a form which can be used by the array input/output unit 13 of the new generation.

According to the present invention, the disk devices 20 used in the disk array apparatus 90 of the previous generation can be used in the disk array apparatus 10 of a new generation.

Without being limited to a disk array apparatus, generally, some products have their respective operation lives. Moreover, with respect to such a product, generation changes occur due to function enhancements thereof, changes in components used therein, changes in a trend thereon, specification changes thereof, and/or the like.

When such generation changes occur, there sometimes arises a case where a disk unit used in a disk array apparatus of a previous generation is desired to be used in a disk array apparatus of a new generation. This is because, for example, usually, a disk array apparatus stores a great amount of data therein, and thus, in the case where all data of a previous generation is moved into disk units of the disk array apparatus of a new generation, a great amount of time and costs are incurred. Further, a reason thereof is that a risk of information leakage exists in such a movement task.

Nevertheless, even when the disk unit used in the disk array apparatus of a previous generation is used in the disk array apparatus of a new generation as it is, the disk array apparatus of a new generation is unlikely to normally operate. This is because, usually, configuration information which is stored into a disk array apparatus of a new generation and is information relating to available types of disk unit, a data storage capacity, an availability level for each disk unit, and the like is not matched with a disk unit of a previous generation.

The technology disclosed in Japanese Unexamined Patent Application Publication No. 2001-337792 is a technology related to mapping between logical configurations and physical location information, and even if this technology is employed, it is difficult to solve the above-mentioned problem due to a difference in such configuration information between generations of the disk array apparatus. The technology disclosed in Japanese Unexamined Patent Application Publication No. 2010-066832 is a technology which is applied to a case where a device in current use is continuously used, and even if this technology is employed, it is also difficult to solve the above-mentioned problem.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A disk array apparatus comprising:
    a conversion rule storage unit that stores a conversion rule associated with a plurality of generations in a first configuration table of the disk array apparatus; and
    a control unit that, from a disk device which stores a generation identifier indicating the generation and a second configuration table, retrieves the generation identifier, and converts the second configuration table on the basis of the conversion rule associated with the retrieved generation identifier,
    wherein
    the second configuration table includes an option for a type of the disk device, and
    the control unit adds a new type of disk device and an associated flag which indicates that the type is not selected as the new option for the type of the disk device in the second configuration table.

2. The disk array apparatus according to claim 1, wherein the second configuration table includes a data storage capacity, and
    the control unit changes a size of a storage area of the data storage capacity included in the second configuration table.

3. The disk array apparatus according to claim 1, further comprising:
    an additional storage device that stores the second configuration table of the disk device associated with the disk device
    wherein, the control unit when a size of the second configuration table becomes larger than an allowable size resulting from the conversion of the second configuration table of the disk device, stores the second configuration table resulting from the conversion into the additional storage device associated with the disk device.

4. The disk array apparatus according to claim 1, further comprising:
an array input/output unit that accesses data of the disk device on the basis of the second configuration table.

5. The disk array apparatus according to claim 3, further comprising:
an insertion/removal unit that connects the disk device and the additional storage device to be able to be inserted and removed; and
a disk input/output unit that inputs/outputs data to/from the disk device.

6. A control method for a disk array apparatus, comprising:
storing a conversion rule associated with a plurality of generations in a first configuration table of the disk array apparatus;
from a disk device which stores a generation identifier indicating the generation and a second configuration table, retrieving the generation identifier, and converting the second configuration table on the basis of the conversion rule associated with the retrieved generation identifier, the second configuration table including an option for a type of the disk device; and
adding a new type of disk device and an associated flag which indicates that the type is not selected as the new option for the type of the disk device in the second configuration table.

7. A computer readable non-transitory storage medium embodying a program, said program causing a disk array apparatus to perform a method, said method comprising:
storing a conversion rule associated with a plurality of generations in a first configuration table of the disk array apparatus;
from a disk device which stores a generation identifier indicating the generation and a second configuration table, retrieving the generation identifier, and converting the second configuration table on the basis of the conversion rule associated with the retrieved generation identifier, the second configuration table including an option for GP a type of the disk device; and
adding a new type of disk device and an associated flag which indicates that the type is not selected as the new option for the type of the disk device in the second configuration table.

* * * * *